May 11, 1926.
H. L. TANNER
ROTOR FOR INDUCTION MOTORS
Filed June 14, 1921
1,584,253
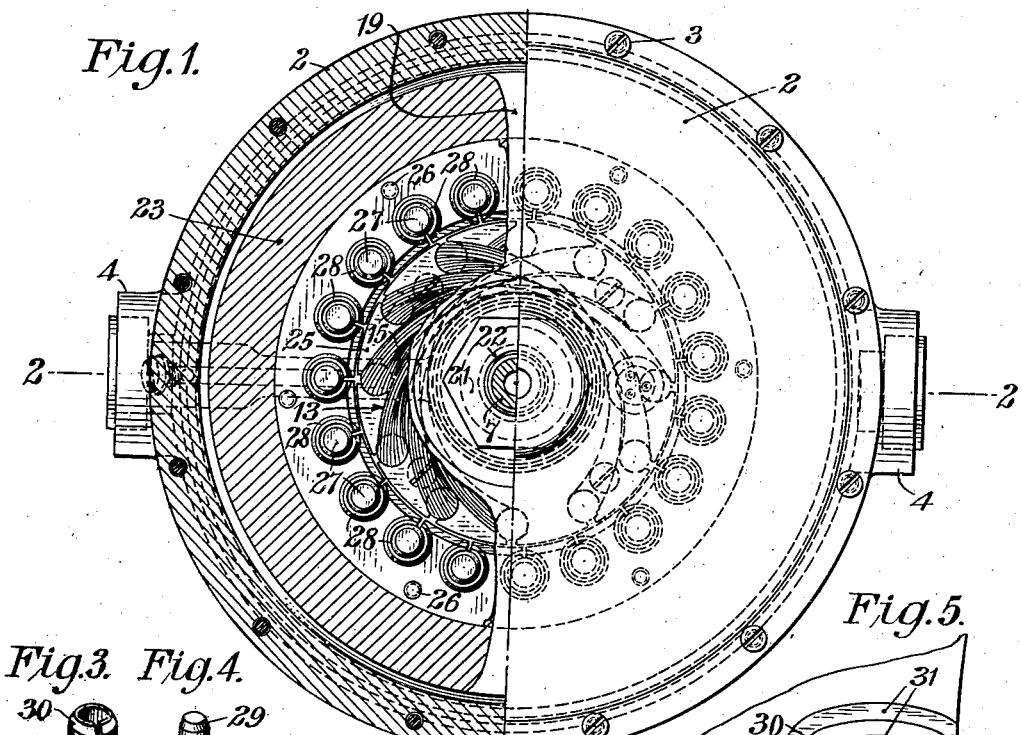
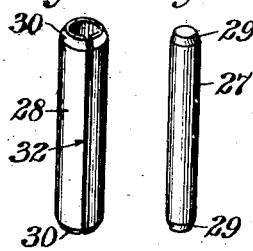
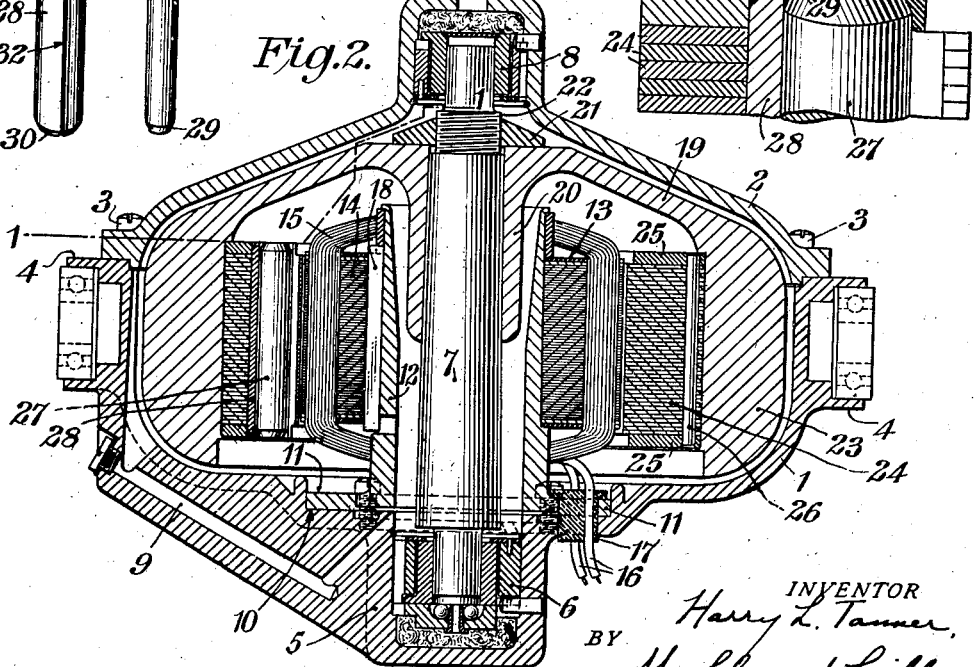
INVENTOR
Harry L. Tanner
BY
Moakley and Gill
ATTORNEYS.

Patented May 11, 1926.

1,584,253

UNITED STATES PATENT OFFICE.

HARRY L. TANNER, OF BROOKLYN, NEW YORK, ASSIGNOR TO FORD INSTRUMENT COMPANY, INC., OF NEW YORK, N. Y., A CORPORATION OF NEW YORK.

ROTOR FOR INDUCTION MOTORS.

Application filed June 14, 1921. Serial No. 477,431.

This invention relates to rotors for induction motors and particularly to rotors of the squirrel cage type for use in small induction motors adapted to be supplied with current of relatively high frequency and which require to be started under load. Under these conditions such motors will not rapidly attain their normal speed on account of the high reactance of the rotor conductors when the motor is started and the consequent low torque due to the phase difference between the flux produced by the stator and the current in the rotor.

It is an object of the invention to provide a rotor of the squirrel cage type particularly adapted for use in motors of the above character and which will have a large torque at starting, but which when it has attained full speed will run with low slip under operating conditions.

A further object of the invention is the provision of a rotor having the above characteristics which shall be of simple construction, strong and rigid and be otherwise adapted for use in small, high speed induction motors such, for instance, as gyroscopes and the like designed to be supplied with polyphase current of relatively high frequency.

The above objects, as well as others which will hereinafter appear, are attained by the provision of a squirrel cage rotor in which each of the low resistance bars is surrounded by a tube of high resistance, magnetic material forming with the bar, a parallel path in which the current will be more nearly in phase with the flux of the rotating magnetic field than is the current in the bar, thus giving the torque required for starting. The presence of the low resistance bar within the high resistance tube increases the skin effect in the tube, thus increasing the effective resistance of the latter to the current which flows through it.

The construction permits the use of conducting bars of circular cross section which have the maximum reactance for a given current carrying capacity and make the best use of the space within the magnetic material of the rotor, which is of especial advantage when this space is limited as it is in small motors. By forming the tubes of magnetic material a high resistance path in parallel with each of the low resistance bars may be obtained without reducing the quantity of magnetic material in the rotor.

If the tubes completely surround the conductors, the rotor will have a high starting torque, but there will be an excessive slip at normal speed. In order to overcome this disadvantage each tube is slotted longitudinally on the side toward the stator. The wider the slots the more nearly will the rotor run at synchronous speed, but the less will be the effect of the tubes in reducing the current in the conductors when the rotor is starting. By suitably proportioning the width of the slots a compromise may be obtained which will give the best result between the two conflicting requirements.

The particular nature of the invention as well as other objects and advantages thereof will appear more clearly from a description of a preferred embodiment. For purpose of illustration the rotor structure of the invention will be described in connection with an induction motor constituting a gyroscope as shown in the accompanying drawings in which—

Fig. 1 is a plan view partly in section of the gyroscope,

Fig. 2 is a sectional elevation taken along the line 2—2 of Fig. 1,

Fig. 3 is a detail view of a tube of a conductor,

Fig. 4 is a similar view of an inner bar of a conductor and

Fig. 5 is an enlarged view showing the end construction of one of the rotor bars and its surrounding tube.

The gyroscope comprises a case 1 and a cover 2 clamped together by screws 3, the case being provided with diametrically opposite sockets 4 adapted to receive the bearings by which the gyroscope may be supported. The case 1 is provided at its bottom with a housing 5 within which is mounted a bearing 6 for the lower end of a tapering shaft 7, the upper end of which extends into a bearing 8 within a housing formed at the top of the cover 2. The case 1 is provided with a passage 9 through which lubricant may flow from the upper portions of the apparatus into the chamber 5 from which it is pumped to the upper bearing 8 through a bore in the shaft 7.

The bearings for this shaft and the arrangement by which the lubricant is pumped through the shaft to the upper bearing form the subject matter of my co-pending application Serial No. 477,432 filed June 14, 1921, and therefore will not be described in detail herein since they constitute no part of the present invention.

The bottom of the case 1 is provided with a circular recess 10 adapted to receive a flange 11 at the bottom of a tubular member 12 which surrounds the shaft 7 and serves as a support for the stator 13 which is made up in the usual manner of a laminated core 14 and windings 15, the terminals 16 of which are carried through an insulating bushing 17 set within the flange 11 and the bottom of the case 1. The case of the stator is supported upon a shoulder on the outside of the member 12, and prevented from turning by a key 18. Since the stator may be of any desired construction adapted to cooperate with the squirrel-cage rotor of the invention, it will not be described in further detail.

Mounted upon the upper portion of the shaft 7 is the rotor or wheel 19 of the gyroscope. The hub 20 of this rotor is provided with a bore having a taper corresponding to that of the shaft 7 so that it may be held firmly thereon by means of a nut 21 screwed upon a threaded portion 22 of the shaft. The outer annular portion 23 of the rotor is relatively thick in order to give the required mass to the rotating member of the gyroscope. This portion of the rotor is provided with a cylindrical inner face within which are mounted the parts constituting its electrical and magnetic elements. These parts consist of a series of iron laminations 24 clamped between conducting end rings 25 by means of bolts 26. The end rings and the laminations are provided at their inner edges with a plurality of apertures within which are placed the conductors of the rotor. Each of these conductors consists of a cylindrical member or bar 27 of conducting material, such as copper, surrounded by a member or tube 28 of magnetic material having a comparatively high resistance, such as iron.

As shown most clearly in Fig. 5, which shows the upper end of one of the conductors of the rotor, the bar 27 is bevelled or chamfered as at 29 while the outer edge of the tube 28 is likewise bevelled as at 30. When these members are inserted within the cylindrical apertures provided through the end plates and laminations of the rotor there are thus formed two channels within which suitable soldering or brazing material 31 may be poured to insure good electrical connections between the members and the end ring 25 as well as to aid in holding these members firmly in place. Any soldering material that may project above the upper face of the end plate 25 may be removed in any suitable manner so as to leave the outer surface of the material flush with the face of the end plate.

As shown most clearly in Fig. 3, each of the tubes 28 is provided with a longitudinal slot 32 which, when the tube is in place in the rotor, lies toward the inner face of the rotor, or toward the stator as shown most clearly in Fig. 1. When filling the channels with the soldering material some of it may run into the upper end of the slot in the tubular member as shown at the right of Fig. 5, but this will do no harm and will increase the firmness with which the bar 27 and its surrounding member 28 are held in place.

It is intended that the gyroscope illustrated in the drawings and described above shall be operated by three phase current of relatively high frequency, but it will be understood that the number of phases and the frequency is immaterial so far as the application of the invention to any other type of induction motor is concerned. It will also be understood that the stator may be provided with any desired number of poles.

As the alternating current begins to flow through the stator windings to produce a rotating field there will be set up in the conductors of the rotor currents which will be of substantially the same frequency as the line current. The reactance of the bars 27 to the current of high frequency which flows through them as the motor is started will cause a large difference in phase between the flux produced by the stator and the current in the bars, with the result that the torque of the rotor due to the current in the bars will be low, and due to its mass a considerable time will be required for it to come up to normal speed. This would be particularly objectionable in the case of a gyroscope used as part of a gyroscopic compass or any other form of nautical apparatus.

Due to the relatively high resistance of the surrounding tubes 28 the current which flows through them when the rotor is starting will be more nearly in phase with the flux produced by the stator. This current will produce the torque required to rapidly bring the rotor up to normal speed, thereby making up for the lack of torque of the current in the bars 27. The current in the bars 27 within the tubes 28 will also increase the skin effect in the tubes thereby still further increasing the effective resistance of the tubes to the relatively high frequency current which flows therein when the rotor is starting.

If the tubes 28 be of complete annular cross section they would possess the advantage of reducing the current in the bars 27, which is largely ineffective, at starting, but they would also produce too much reactance even after the rotor had come up to speed, and thereby cause an excessive degree of slip. In order to counteract this the tubes are slotted longitudinally to provide an air gap in each tube at the inner face of the rotor. The wider the slots the lesser will be the reactance of the bars and the more nearly will the current therein be in phase with the flux of the stator. This will be an advantage under running conditions as it will reduce the slip of the rotor. In practice the slots will be of a suitable width to give the best results under both starting and running conditions, the width for any particular rotor depending upon the characteristics of the motor in which it is to be used and the service for which the motor is intended.

Not only does the presence of the surrounding tubes increase the starting torque of the rotor, but this result is accomplished without requiring that the cross-section of magnetic material in the rotor be reduced since the tubes are formed of magnetic material. The bars of the conductors may be of circular cross section which gives the maximum reactance for a given current carrying capacity and occupies less of the space within the iron of the rotor than does any other form of bar. This is of particular advantage in the case of small motors. The arrangement thus gives a high resistance path in parallel with each of the low resistance bars without interfering in any way with the area of the surrounding iron.

The rotor construction described above possesses, in addition to its advantages from the standpoint of operation, many mechanical advantages which render it particularly adapted for use in connection with motors which should be driven at high speed, such as gyroscopes and the like. These advantages reside in the simplicity and strength of construction and in the lack of any tendency for the conducting members to shift within the laminations of the rotor since the tubes serve as supports for the bars and the presence of the soldering material at the ends of the members increases the security with which they are held in place.

While the invention has been shown and described in connection with a particular form of induction motor, i. e., a gyroscope, it will be understood that it is equally applicable to induction motors adapted for other purposes and also that various changes in the details of construction of the elements of the invention may be made without departing from the principle thereof as defined in the appended claims.

I claim—

1. A dynamo-electric machine rotor comprising conducting end rings, core laminations between said rings, a plurality of cylindrical conductors extending through said laminations to the outer surfaces of said rings, and axially slotted conducting tubes sheathing and retaining said conductors, said tubes having circumferentially chamfered ends connected to said rings with fusible conducting material.

2. A dynamo-electric machine rotor comprising conducting end rings, core laminations between said rings, a plurality of conductors extending through said laminations to the outer surfaces of said rings, and axially slotted conducting tubes sheathing and substantially as long as said conductors, said tubes having their ends connected to said rings and conductors with fusible conducting material.

In testimony whereof I affix my signature.

HARRY L. TANNER.